W. A. FRY, W. C. DARBY & T. H. KERSHAW.
DEVICE FOR MOLDING CONCRETE WALLS.
APPLICATION FILED JUNE 1, 1908.
1,003,591.
Patented Sept. 19, 1911.
2 SHEETS—SHEET 2.
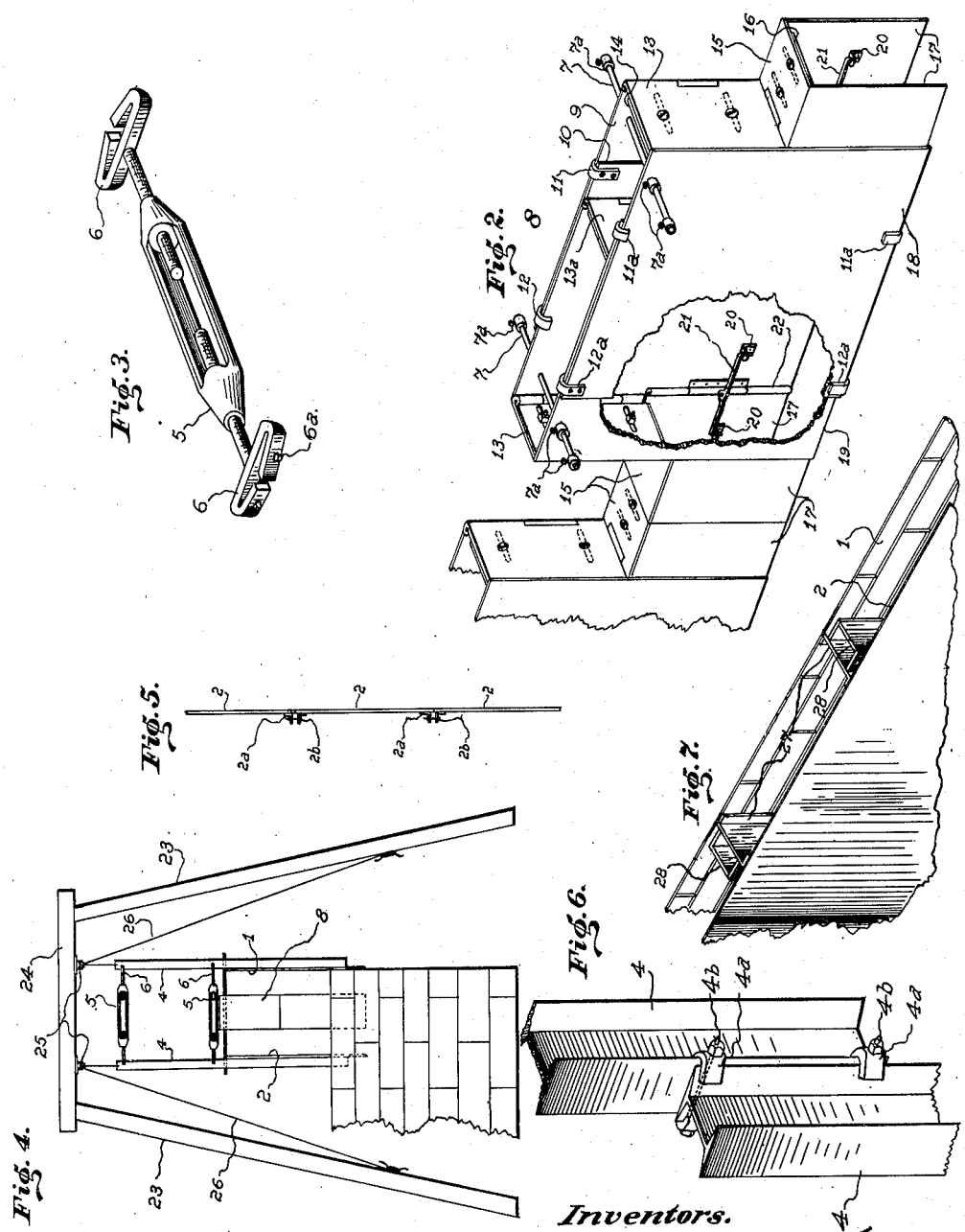
Witnesses.
Inventors.
William Amzie Fry
Willard Clark Darby
Thomas Henry Kershaw
By Lyman L. Henry
Attorney.

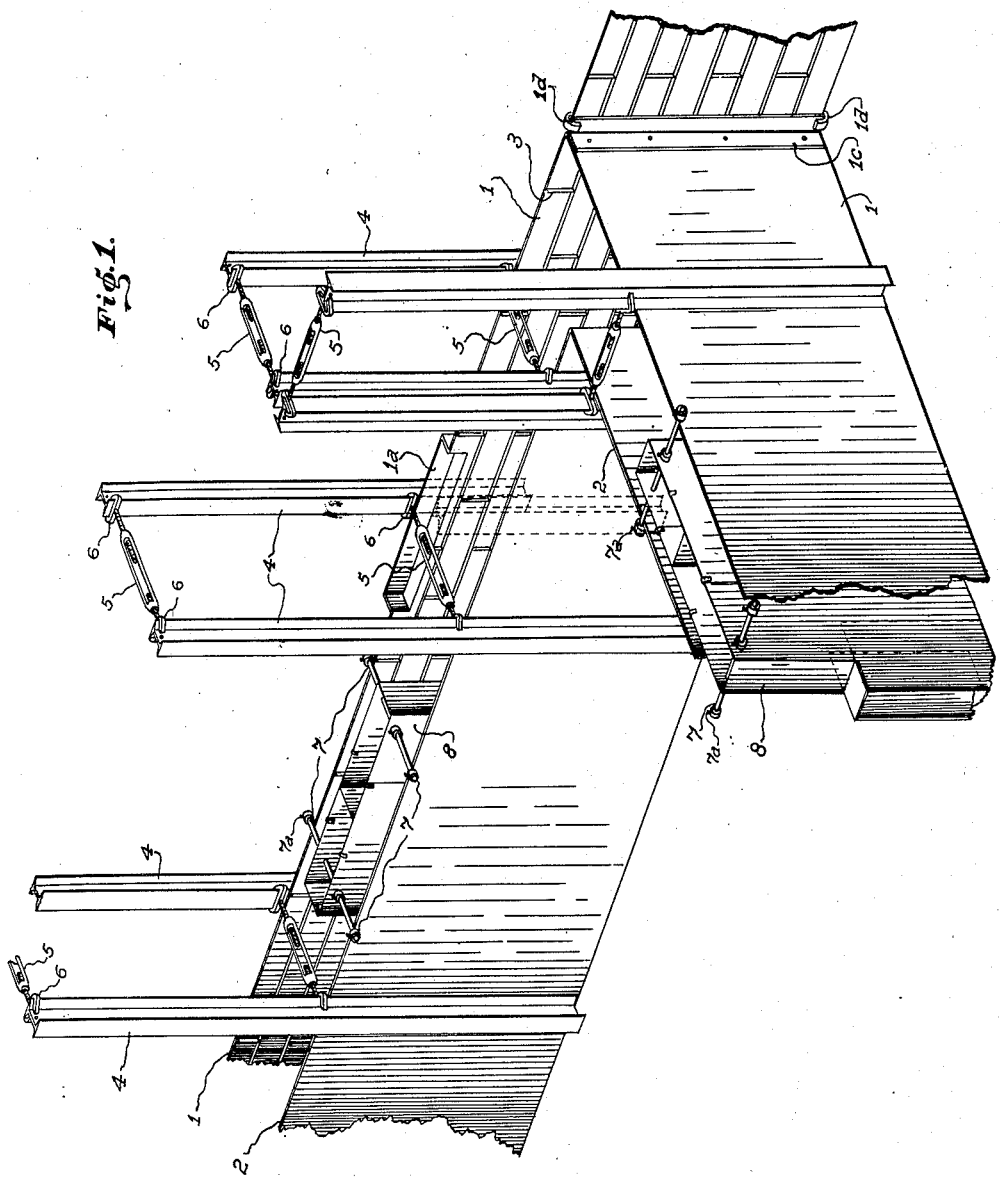

UNITED STATES PATENT OFFICE.

WILLIAM ANCILE FRY, WILLARD CLARK DARBY, AND THOMAS HENRY KERSHAW, OF PUEBLO, COLORADO.

DEVICE FOR MOLDING CONCRETE WALLS.

1,003,591.   Specification of Letters Patent.   Patented Sept. 19, 1911.

Application filed June 1, 1908. Serial No. 435,906.

*To all whom it may concern:*

Be it known that we, WILLIAM ANCILE FRY, WILLARD CLARK DARBY, and THOMAS HENRY KERSHAW, citizens of the United States, and residents of Pueblo, in the county of Pueblo and State of Colorado, have invented a new and useful Improvement in Devices for Molding Concrete Walls.

Our invention relates to improvements in devices for molding concrete walls in which side pieces, on which any desired markings may be placed, are held in position by perpendicularly disposed beams that are adjustably retained by turnbuckles, and openings within the walls are formed by collapsible boxes so they may be removed from the walls; all arranged so a convenient height of wall, entirely around the building, and all openings and projections may be formed at one time whereupon the molding devices are raised to a proper position to form another section of the walls.

The objects of our invention are; first, to provide means for molding the walls of buildings in sections, each section encircling the building thereby giving greatest strength to said walls; second, to provide such molding devices with means for carrying the markings of ornamentation and forms to mold all projections and openings in the walls; third, to provide means for molding hollow walls; and, fourth, to provide such molding devices with means for constructing walls of varying dimensions. We attain these objects by the mechanisms illustrated in the accompanying drawings in which,—

Figure 1 is a perspective view, in broken section, showing the parts of our invention in place at the corner of a building. Fig. 2 is a perspective view of the collapsible core box used to form openings within the walls; Fig. 3 is a perspective view of one of the adjusting turnbuckles, with its finger bolts; Fig. 4 is an end elevation showing manner of elevating our molds in position to construct an additional section; Fig. 5 is a top, or plan, view of a portion of one of the side pieces of the wall mold showing manner of joining them together; Fig. 6 is a perspective view showing manner of splicing the clamp beams to pass an offset in the wall; and Fig. 7 is a perspective view, in broken section, of a portion of the side pieces of the wall mold showing stop plates used in stopping out openings for doors, windows and the like.

Similar numerals refer to similar parts throughout the several views.

The side pieces for construction of the wall consist of outside wall plates 1 and inside wall plates 2. On the inside of wall plates 1 and 2 may be placed marking pattern 3 of any desired design whenever it is desired to mark the walls produced in any manner, and such pattern may be attached to plates 2 as well as to plates 1. These plates are made in sections of suitable lengths to which are attached angle irons $2^a$ through which are bolts $2^b$ by means of which the ends of the wall plates are brought close together without leaving space or markings and thus the wall plates may be joined together in any desired length as shown in Fig. 5; and by means of said angle irons the outside plates 1 may be joined at a corner by means of clamps holding the one portion of the angle iron firmly against plate 1 as shown by clamps $1^d$ and connecting angle iron $1^c$, Fig. 1. When it is desired to form projections on the wall the same is accomplished by the pattern of desired projections being attached to one of the plates as $1^a$, Fig. 1.

The plates being attached according to the plan of wall designed are held in place and proper position by beams 4 and turnbuckles 5 on finger bolts 6. Beams are placed the required distance apart in pairs, one beam on each side of the plates, and the turnbuckles and finger bolts are adjusted one near the top of the side plates 1 and 2 and one at the top of beams 4 which extend some distance above, and by the adjustment of the turnbuckles said beams are brought into position to bear upon the plates 1 and 2, said plates being secured to said beams, so that they assume the position desired and the upper turnbuckle serves to push the top of the beams out while the lower turnbuckle serves to pull the lower part of the beams together and hold them pressing against the plates 1 and 2. Whenever projections as $1^a$ occur in the wall the said beams 4 are spliced by clamp washers 4ª with bolts 4ᵇ, so as to pass around such projections and continue the beam. The finger bolts of said turnbuckles which fit over the flanges of beams are held in position by set screws 6ª.

Whenever it is desired to make openings in the wall for doors and windows and it is desired to continue the plates throughout the length of such openings, we have provided stops 27 which may be placed between pieces 1 and 2 to create spaces as in Fig. 7, and have attached to said stops forms 28 to form space for window weights.

We provide adjustable core box 8, Fig. 2, by means of which cores of desired lengths and widths may be made, which core box is composed as follows: Side plates 9 and 10 overlap and are provided at the top and inner end with clip 11 on side plate 10 which plate overlaps plate 9 and is slidable thereon with a corresponding like clip at the bottom on plate 10 slidable on plate 9, and a clip 12 attached at the top and inner end of plate 9 slidable on plate 10 and a corresponding like clip attached at the bottom to plate 9 also slidable on plate 10; in like manner the opposite side is constructed, plates 18 and 19 overlap and plate 19 has attached at the inner end at top and bottom clips 11ª slidable on plate 18 and plate 18 has attached at the inner end at top and bottom clips 12ª slidable on plate 19, in this manner making the sides formed by plates 9 and 10 and plates 18 and 19 adjustable to varying lengths. At each end and upper part of 8, Fig. 2, a door is attached by hinges respectively to plate 9 and plate 10, and said door at each end is composed of plate 13 hinged in each case to plate 9 and plate 10, to which plate 13 is attached by set screws in slots, plate 14, so that varying widths may be obtained. Plate 15 is hinged to the lower end of plate 13 and plate 16 is attached to plate 15 by set screws in slots so that varying widths may be obtained; plates 17 are hinged one to the outer end of each of the plates 9, 10, 18 and 19, extending from lower part of 13 to bottom of core box 8, Fig. 2; hinged plates 17 are each provided with a knuckle-jointed arm 21, one end of which is pivotally attached to side plates 9, 10, 18 and 19 respectively and the other end is attached pivotally to 17 as at 20; rods 7 one of which is near each end and near top of core box 8 extend through plates 9 and 18 and plates 10 and 19, on each of which rods are placed collars with set screws 7ª the inner collar to adjust plates for width desired and the outer collars on each rod to adjust position of core box 8 with respect to wall pieces 1 and 2 as shown in Fig. 1; and a door 13ª composed of two plates slidable and attached by set screws may be attached by hinges to one side of core box 8 and inside to be used for bracing or stiffening the sides of the core box. The core box is duplicated throughout length of wall by joining core boxes as shown in Fig. 2.

We provide derrick frames composed of legs 23 astride the wall to be constructed and beams 24 to which beams are attached pulleys 25 over which cables, 26 attached to beams 4, operate to lift the beams and plates as shown in Fig. 4.

It will thus be seen that to operate our device the plates 1 are joined to represent one side or outside of wall and plates 2 are joined to make the face of one side or inside of wall, the corners, are made by use of clamps and angle irons, being formed and plates being connected by means of angle irons 1ᶜ, are placed in position around the whole of the wall to be constructed, or any determined portion thereof; and the stops are adjusted for window or open spaces desired. The turnbuckles are adjusted to hold the wall plates in place. The respective side plates of core box are adjusted to the desired length and the door 13 and plate 15 are adjusted by means of set screws and slots to the required width of space to be formed, when doors 13 and 13ª are opened out at right angles to the attaching sides and the side plates 18—19 are placed against the doors where they are held by the adjustable collars with set screws on rods 7, the sides and doors being thus arranged the plates 17 are opened outwardly and retained in place by knuckle-jointed arms 21, and hinge plate 15 is opened upward and rests on plates 17. The core box 8, being thus set up, is placed between the side wall plates 1 and 2, as in Fig. 1, and is held in place by outer collars and set screws on rods 7, the collars being adjusted to the edges of side plates 1 and 2, and a series of core boxes is placed end to end along the course of the wall between the side plates 1 and 2; with the parts thus in position the space between side plates 1 and 2 and around core boxes is filled with cement material to the top of side plates 1 and 2; thus forming hollow walls except the solid portion that lies above plates 15 which forms a tie between the two portions of the wall. Upon the space being filled in, the core boxes may be collapsed and removed by pressing inwardly the knuckle-jointed arm 21, thus drawing plates 17 inwardly and permitting plate 15 to drop down and doors 13 and 13ª are then closed inwardly, which releases the side plates 9—10 and 18—19 from pressure against cement material and the whole may be lifted out by rods 7; the turnbuckles are released and plates 1 and 2 released from pressure against the cement material, and by means of the derrick and cables, Fig. 4, the whole structure is lifted for the next course, and in practice the core boxes may be lifted along with the side wall plates 1 and 2 when lifted by cables attached to derrick. In the next succeeding course the core boxes would be so placed as to form core over the part of wall left solid in the preceding course and thus alternate throughout the structure.

Having thus described our improvement, we claim,

In a cement wall molding device of the character described comprising side wall plates in sections attachable, a core box comprising slidably joined side pieces, hinged end door pieces, each hinged end door piece carrying a slidable plate adjustable by means of set screws in slots, a plate hinged to said hinged door end piece carrying a plate adjustable by means of set screws in slots, plates hinged to said slidable side pieces and operatively connected thereto by knuckle-jointed arms, and rods and collars thereon having set screws in combination with said slidable side pieces, all substantially as described.

WILLIAM ANCILE FRY.
WILLARD CLARK DARBY.
THOMAS HENRY KERSHAW.

Witnesses:
R. R. MILLER,
GEO. L. WALKER.